UNITED STATES PATENT OFFICE.

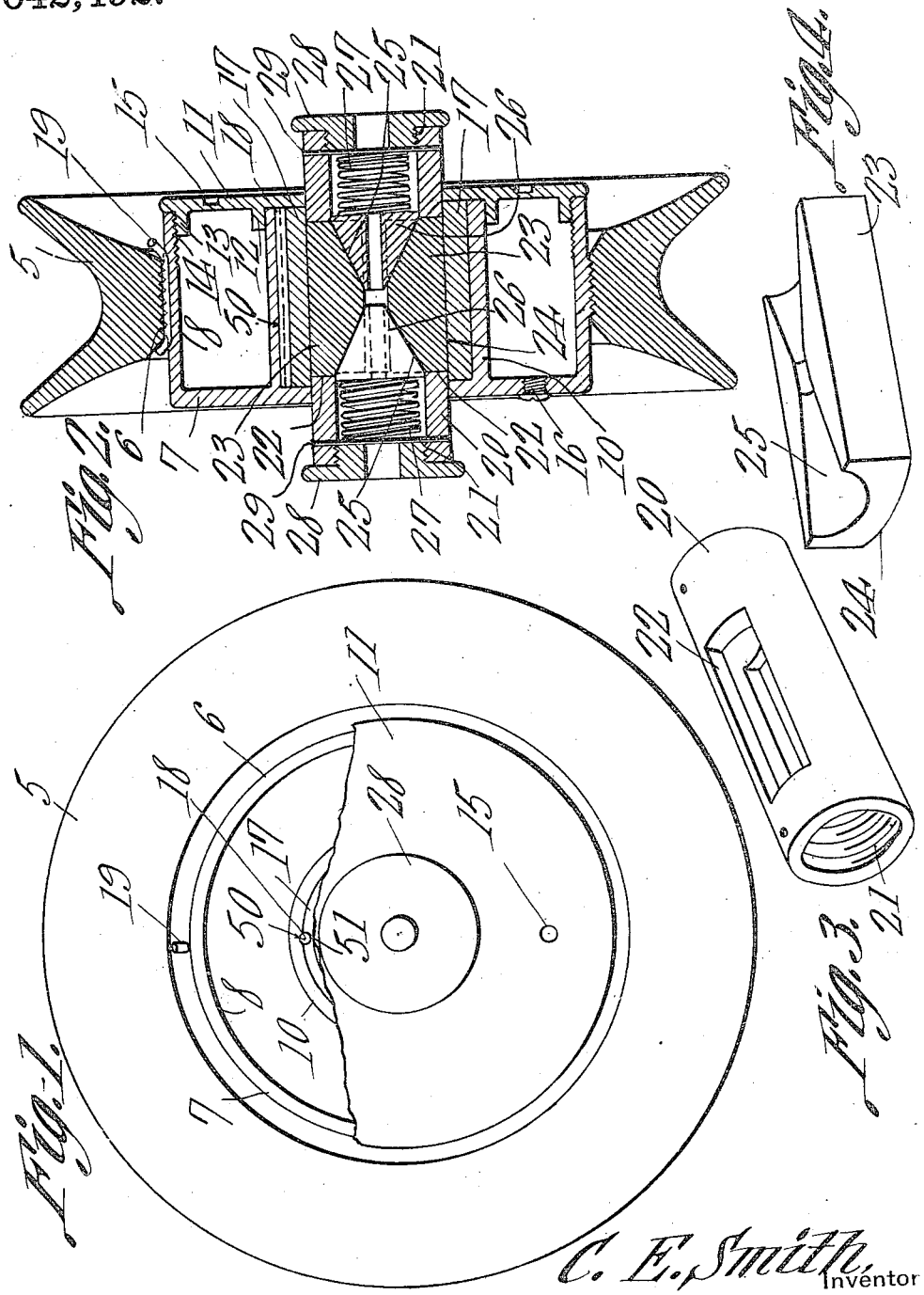

CHARLEY E. SMITH, OF SHERMAN, TEXAS.

TROLLEY-WHEEL.

1,042,492.   Specification of Letters Patent.   Patented Oct. 29, 1912.

Application filed April 17, 1911. Serial No. 621,527.

*To all whom it may concern:*

Be it known that I, CHARLEY E. SMITH, a citizen of the United States, residing at Sherman, in the county of Grayson and State of Texas, have invented a new and useful Trolley-Wheel, of which the following is a specification.

This invention relates to trolley wheels, and has for its object to provide an axle therefor having wear compensating and contact blocks mounted therein and means for spreading the said blocks within the hub of the wheel. This object is accomplished by the construction described below and shown in the drawings wherein—

Figure 1 is a side elevation of this trolley wheel partly broken away. Fig. 2 is a central transverse sectional view thereof. Fig. 3 is a perspective view of the axle, and Fig. 4 is a perspective view of one of the wear-compensating and contact blocks.

Referring in detail to the drawings, the numeral 5 designates the grooved rim which has the internal screw-threads 6, and the numeral 7 designates the hub which is formed with an annular oil-chamber in one end thereof to form the outer and inner walls 8 and 10, respectively. The open side of the annular oil-chamber is closed by a cap 11 having concentric annular flanges 13 and 12, the former flange being screw-threaded into the wall 8 as designated by the numeral 14 and the flange 12 fitting over the edge of the wall 10. The cap 11 is provided in its outer face with sockets 15 for the application of a spanner wrench by means of which the cap may be rotated to be attached or detached from the hub 7. The hub 7 is provided in its closed end with a screw-threaded aperture closed by a screw-plug 16, and by removing the plug it will be seen that the oil or other lubricant may be readily poured into the oil-chamber. A bushing 17 fits within the inner wall 10, and the said bushing is held against rotation by means of a pin 18 which is driven into the registering grooves 50 and 51 in the outer face of the bushing and inner face of the wall, respectively. The rim 5 is attached upon the hub 7 by means of the screw-threads 6 which are engaged upon similar threads upon the periphery of the hub, and the said rim and hub are constrained against rotation relative to each other by means of a pin 19 driven through registering grooves in the adjacent faces of the rim and hub. Thus it will be seen that the rim, hub, bushing and the cap rotate with each other.

The axle comprises a tubular member 20 having the internal screw-threads 21 at its extremities and having elongated or rectangular openings 22 intermediate its ends. There are preferably two of these openings, and in each of the openings is arranged a rectangular wear-compensating and contact block 23, the said blocks fitting snugly in the said openings for radial reciprocatory movement, and the outer face 24 of each of the blocks is curved or convexed to conform with the curvature of the bushing 17. These blocks 23 have complementary semi-conical grooves 25 in the ends thereof, and conical spreaders 26 are engaged in the respective grooves. The spreaders 26 are forced inwardly by means of coil springs 27 compressibly disposed between the said spreaders and flanged caps 28 screw-threaded into the ends of the axle, which caps have flanges of larger diameter than the axle. Pins 29 are also passed through the ends of the axle over the outer ends of the springs 27.

The axle 20 is arranged within the hub 7 and fits within the bushing 17, the openings 22 being arranged within the hub and the blocks 23 contacting with the bushing to lead the current from the hub to the axle and the hub being retained on the axle by the flanged caps. It will be seen that by virtue of the inward tension given to the spreaders 26, the blocks 23 will be forced outwardly to contact with the bushing 17 and compensate for the wear of the bushing and the said blocks. The axle 20 is secured within the harp of the trolley pole in the customary manner, the same remaining stationary while the hub 7 rotates upon the same. The axle and bushing are lubricated by the oil or other lubricant contained within the hub 7, the lubricant working its way to the axle.

What is claimed is:

In a trolley-wheel, a tubular axle passing through the hub thereof and having elongated openings therein within the hub, wear-compensating and contact blocks disposed in said openings and having complementary semi-conical grooves in their ends, conical spreaders engaged in the grooves, caps engaged on the ends of the axle, and having flanges of larger diameter than the axle to retain the hub on the axle and coil springs compressibly disposed between the caps and spreaders to force the blocks radially.

In testimony that I claim the foregoing as my own, I have hereto affixed my signature in the presence of two witnesses.

CHARLEY E. SMITH.

Witnesses:
J. M. FAHEY,
R. WALSH.